US006599131B2

(12) United States Patent
Wolfson

(10) Patent No.: US 6,599,131 B2
(45) Date of Patent: Jul. 29, 2003

(54) MODULAR EDUCATIONAL AND/OR RECREATIONAL APPARATUS TO VARY LEARNING LEVELS

(76) Inventor: Benjamin Samuel Wolfson, 4621 10$^{th}$Ave., Brooklyn, NY (US) 11219

( * ) Notice: Subject to any disclaimer, the term of this patent is extended or adjusted under 35 U.S.C. 154(b) by 0 days.

(21) Appl. No.: 09/885,907

(22) Filed: Jun. 20, 2001

(65) Prior Publication Data

US 2002/0197592 A1 Dec. 26, 2002

(51) Int. Cl.$^7$ ............................................... G09B 25/00
(52) U.S. Cl. ........................ 434/403; 434/428; 40/775
(58) Field of Search .................. 434/258, 259, 434/365, 403, 405, 428; 446/120, 124; 40/107, 605, 775

(56) References Cited

U.S. PATENT DOCUMENTS

| | | | | |
|---|---|---|---|---|
| 2,623,303 A | * | 12/1952 | Mindel | 434/259 |
| 2,914,871 A | * | 12/1959 | Smith et al. | 40/107 |
| 3,125,385 A | * | 3/1964 | Friedman | 312/107 |
| 3,414,987 A | * | 12/1968 | Lindenauer | 434/429 |
| 4,522,598 A | * | 6/1985 | Coyne et al. | 434/259 |
| 4,696,652 A | * | 9/1987 | Reeder et al. | 434/219 |
| 5,154,656 A | * | 10/1992 | Milstein | 434/259 |
| 5,316,309 A | * | 5/1994 | Takeshi | 273/138.1 |
| 5,755,576 A | * | 5/1998 | Dunn et al. | 273/454 |
| 6,186,553 B1 | * | 2/2001 | Phillips et al. | 283/2 |

* cited by examiner

Primary Examiner—Kien T. Nguyen

(57) ABSTRACT

An apparatus for educational and/or recreational learning provides a means for stimulus or query to test skill and knowledge, generate a response to the stimulus or query, and rewards correct responses to reinforce learning. The educational and/or recreational apparatus has at least one housing containing at least one compartment. The housing has a modular exterior surface appropriate for joining with other housings. Each compartment in each housing is associated with a first opening on a surface of the housing. At the first opening of each compartment is a removable cover. Each removable cover at each compartment is placed at each first opening to selectively expose and conceal an interior of each compartment. The educational and/or recreational apparatus further has at least one display device such as a shelf or a transparent pocket to display member or information card. Each display device is associated with each first opening and retains the display member containing educational and/or recreational information that can provide the stimulus or query. A gift or reward object may be placed within selected compartments and the removable cover can conceal the gift or reward object within the compartment. A person participating in the recreational and/or educational activity upon accurately solving a query may remove the covering to access the gift or object.

23 Claims, 6 Drawing Sheets

MODULAR EDUCATIONAL AND/OR RECREATIONAL APPARATUS TO VARY LEARNING LEVELS

FIELD OF THE INVENTION

This invention is related to educational and/or recreational learning apparatus and methods of use for these educational and/or recreational learning devices. More particularly this invention is related to educational and/or recreational learning apparatus to provide advancement in learning by providing reinforcement for correct responses particularly for children with learning disabilities of varying degrees.

BACKGROUND OF THE INVENTION

Various learning and recreational devices that employ covered compartments or chambers are known in the art. These devices include many different structural arrangements to stimulate learning in a recreational manner. Generally, the objective is to teach and/or provide a stimulus to test a skill or knowledge while generating a response.

For example, the patent to Reeder et al. (U.S. Pat. No. 4,696,652) describes the front facade of a post office. Similar to the concept of post office boxes, the device includes an array of doors, each with a number and an associated internal compartment. The internal compartments are openly accessible from the rear of the facade. It is noteworthy that the doors are made from a transparent material so that the contents of each internal compartment are also readily visible from the front of the facade when each door is closed.

The patent to Coyne et al. (U.S. Pat. No. 4,522,598) discloses a toy mailbox. The front of the mailbox has a mail slot as well as an array of doors with numbers and keyholes. Each door has an associated internal compartment. The rear of the mailbox may be opened to reveal the backs of each internal compartment. The rear of each internal compartment has the same number as the related door. The rear of each internal compartment has a unique slot fitted to receive a comparably sized block. In general, the inside of each internal compartment is only designed to be viewed from the front of the mailbox when the related door is open.

The Nelson patent (U.S. Pat. No. 5,316,309) teaches a memory game with many doors. The opaque doors may be opened to reveal symbols hidden behind. The object is to match pairs of symbols behind the doors by opening two doors at a time.

While, these prior devices may be entertaining for children in general, they are wholly unsatisfactory for use as an educational or testing tool, particularly with respect to children with learning or cognitive disabilities or impairments. For this smaller group of children, where the capacity for abstract thought or problem solving is impaired, it is widely recognized that simpler and more concrete methods are required. Thus, where testing or educational devices provide too much sensory stimulus, the device may be inappropriate to serve as a tool for learning impaired children. Moreover, where devices do not provide mechanism for adjusting the levels of sensory stimulus, the device may only have a limited application.

SUMMARY OF THE INVENTION

An objective of this invention is to provide an apparatus for educational and/or recreational learning.

A further objective is to provide an apparatus more suited for children with disabled or impaired learning abilities.

Another objective of this invention is to provide an educational apparatus to provide a stimulus or query to test skill and knowledge, generate a response to the stimulus or query, and reward correct responses to reinforce learning.

A still further objective is to provide such a dynamic apparatus that may be used with children of varying levels of ability.

Additional objectives will be apparent from the description of the invention that follows.

To accomplish these objectives, the following invention involves an educational and/or recreational apparatus with at least one housing that contains one or more compartments. Each compartment has a first opening on a first surface of the housing. At the first opening associated with each compartment, there are removable covers or doors.

The removable cover at each compartment may be placed at each first opening to selectively expose and conceal the interior of the associated compartment. To this end, each removable cover may have a hinge to attach the removable cover to the first surface of the housing in close proximity to a corresponding first opening. Additionally, each removable cover may have a one latch to secure the removable cover to the first surface to conceal a corresponding first opening.

The apparatus further has at least one display device such as a shelf or a transparent member to accept a display member. Each display device is associated with each first opening or the cover of the first opening. In general, the display device is used to vary viewable information associated with the first opening. Typically, the display member will contain educational and/or recreational information to provide the stimulus or query and is at least visible when the associated removable cover is concealing the associated first opening.

Utilizing these features, a user may place a gift or reward object within selected compartments and the removable covering are placed to conceal the gift or reward object within the compartment. A person participating in the recreational or educational activity upon accurately solving a query may remove the covering to access the gift or object.

In one embodiment, each compartment of the educational and/or recreational apparatus may have a second opening placed on a surface of the compartment opposite the first opening. The second opening may be used to insert and remove gift or reward objects without removing the cover of first opening.

Preferably, the educational and/or recreational apparatus may be formed of multiple housings where each housing has modular or compatible surfaces. The surfaces allow the housings to be aligned with the sides of other housings such that each first surface of each housing are contiguous. Thus, the first surface of each of the multiple housings are united to form a uniform first surface.

DETAILED DESCRIPTION OF THE INVENTION

Figure 1:
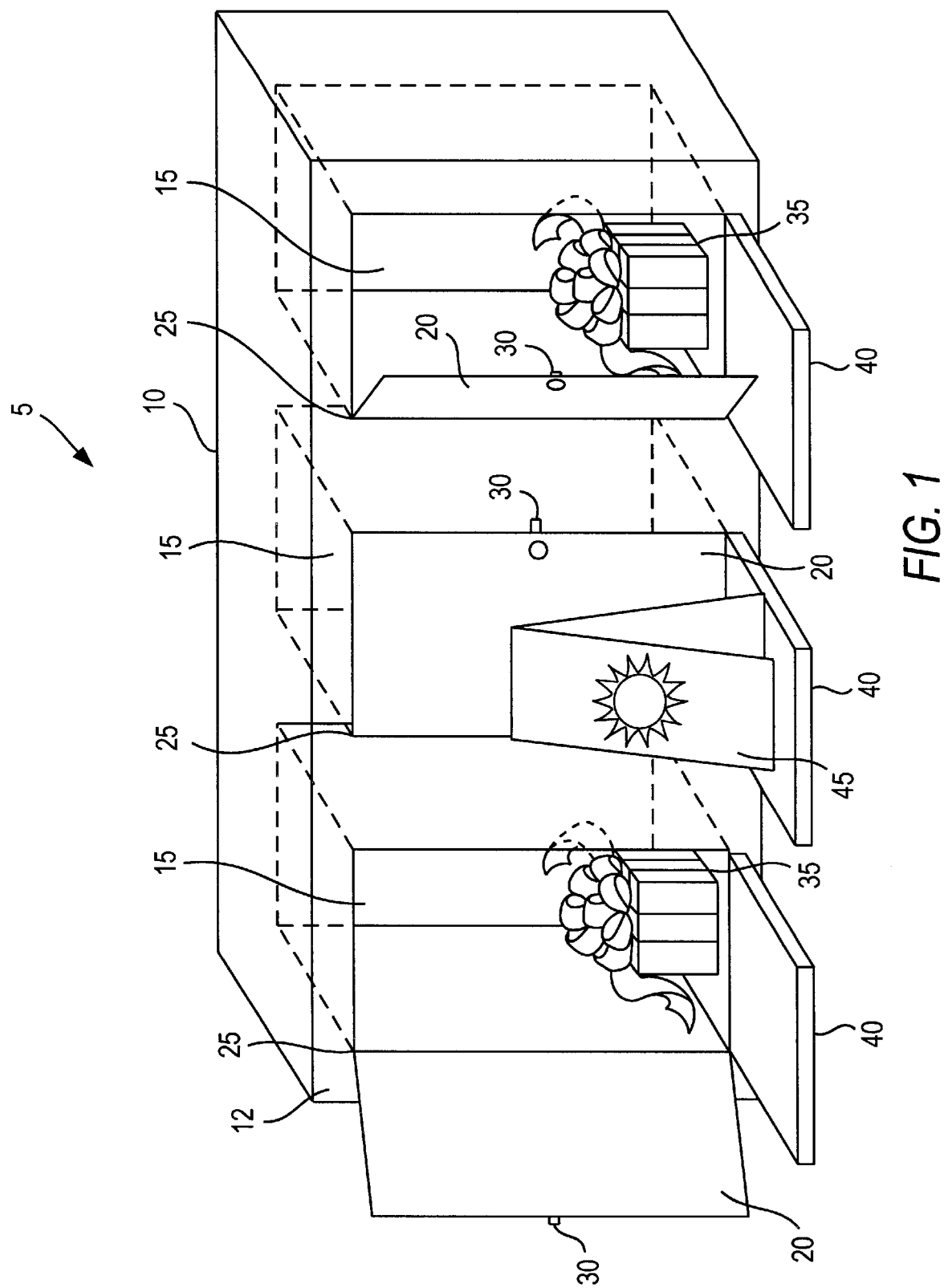
FIG. 1 is a perspective drawing of a first embodiment of a single housing of the educational and/or recreational apparatus of this invention.

Refer now to FIG. 1 for a discussion of the educational and/or recreational apparatus 5 of this invention. The apparatus has at least one housing 10. In each housing 10 a number of compartments 15 are formed with openings to a front surface 12 of the housing 10. A removable cover or door 20 is connected by a hinge 25 to the front surface 12 of the housing 10 to selectively expose or conceal the contents of its associated compartment 15. An optional latch 30 is mounted to each door 20 to secure the door 20 to the front surface 12 of the housing 10 and server as a handle for opening the door 20. In the preferred embodiment, the latch 30 is replaced by a handle. For this embodiment, a magnet is used to secure the door. By use of this handle and magnet combination, the act of opening the door 20 is simplified for children who may have difficulty operating the latch 30.

Further, associated with each compartment 15 is a surface shelf 40 that acts as a display device. The surface shelf 40 is attached to the front surface 12 of the housing 10. Preferably, the shelf 40 may be retractable. Through the use of a shelf 40, the display device allows a user to vary some viewable information that is associated with the first opening. In this embodiment the surface shelf 40 is mounted beneath the opening in the front surface 12 of an associated compartment 15.

A display member 45, which may be a card, may be associated with each door 20 through use of the display device or shelf 40. The display member 45 contains graphic, picture, or textual information. One or more display members 45 may be used to form a query during application of the educational and/or recreational apparatus of this invention.

A gift or prize object 35 is placed in selected compartments 15 to act as a reward for successful response to a query. Alternately, the gift object 35 is placed in one selected compartment. All doors 20 are closed to conceal the gift object 35. A person using the educational and/or recreational apparatus would then be motivated to locate the compartment 15 containing the gift object 35 based upon the query and display card 45. The person is rewarded upon opening the door 20 and discovering the gift object 35.

Figure 2:
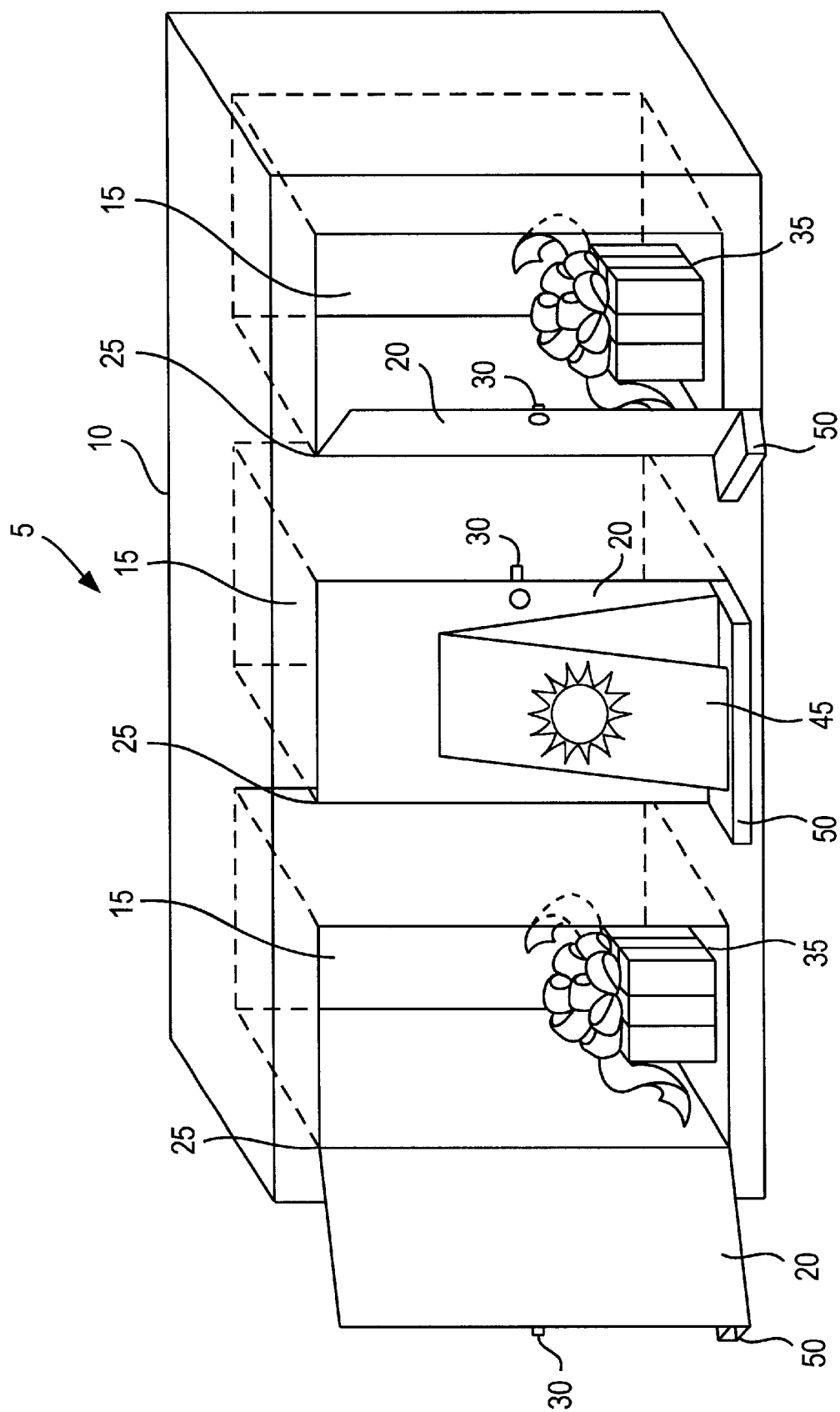
FIG. 2 is a perspective drawing of a second embodiment of a single housing of the educational and/or recreational apparatus of this invention.

FIG. 2 illustrates a second embodiment of the educational and/or recreational apparatus 5 for this invention. The basic structure of the apparatus 5 is similar to that as described for FIG. 1 except the surface shelf 40 of FIG. 1 is removed and replaced with the door shelf 50 mounted to the door 20. As described in FIG. 1 for the surface shelf 40, the door shelf 50 acts as a display device to retain the display member 45. The door shelf 50 is attached to an associated door 20 and is moved as the door 20 is opened to reveal the interior of the compartment 15.

Figure 3:
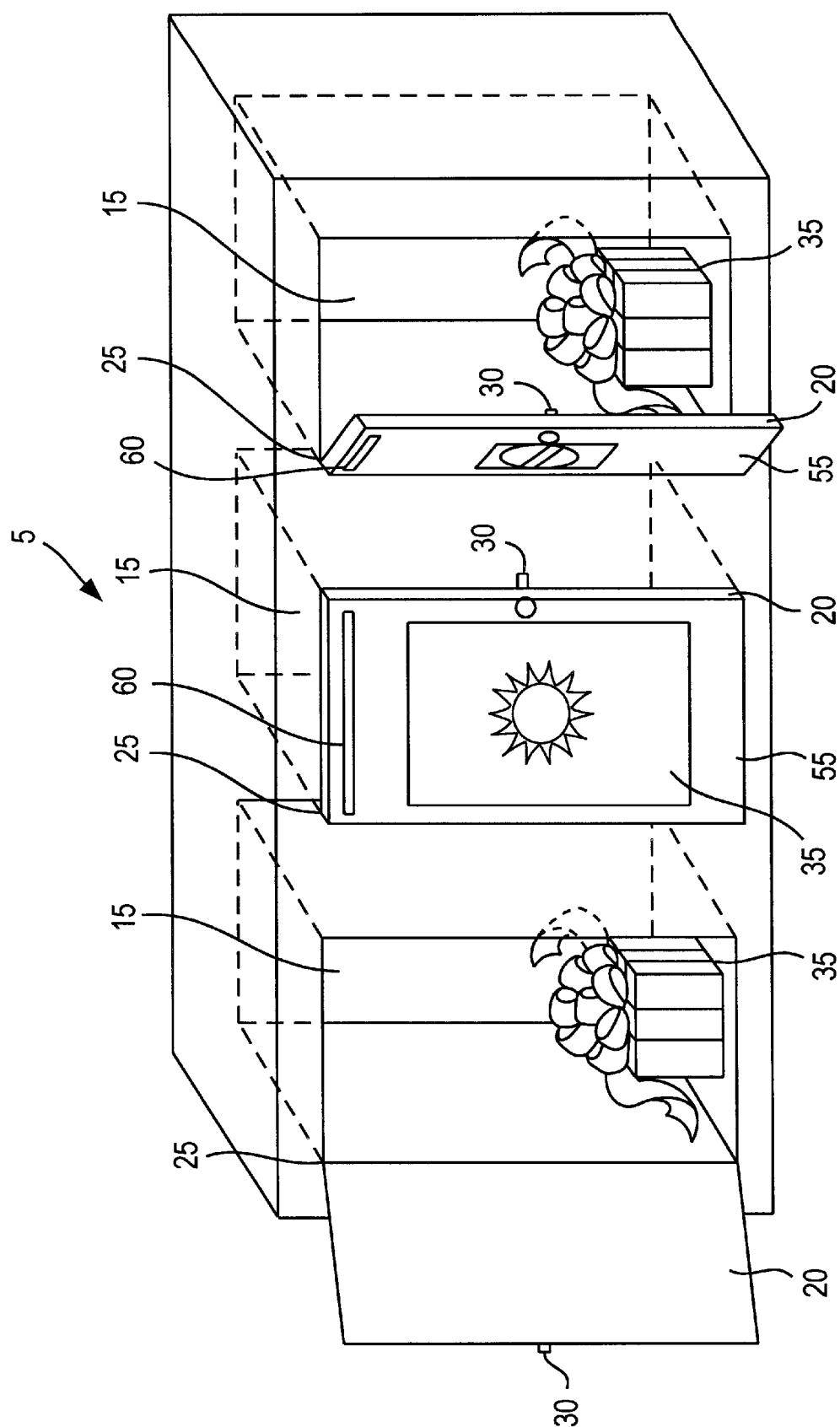
FIG. 3 is a perspective drawing of a third embodiment of a single housing of the educational and/or recreational apparatus of this invention.

A third embodiment of the educational and/or recreational apparatus is shown in FIG. 3. Again, as with FIG. 2, the basic structure and function as described in FIG. 1. In this embodiment the surface shelf 40 of FIG. 1 and the door shelf 50 of FIG. 2 are removed and a transparent pocket 55 is used on the door 20. The transparent pocket 55 allows the display member 45 to be retained and displayed. Thus, transparent pocket 55 has a slot 60 that allows placement of a display member 45 within the transparent pocket 55 on the door 20. As will be apparent to one skilled in the art, many alternative display devices may be utilized to associate a display member 45 with the door 20 or compartment 15 such as, for example, a clip or hook.

Figure 4:
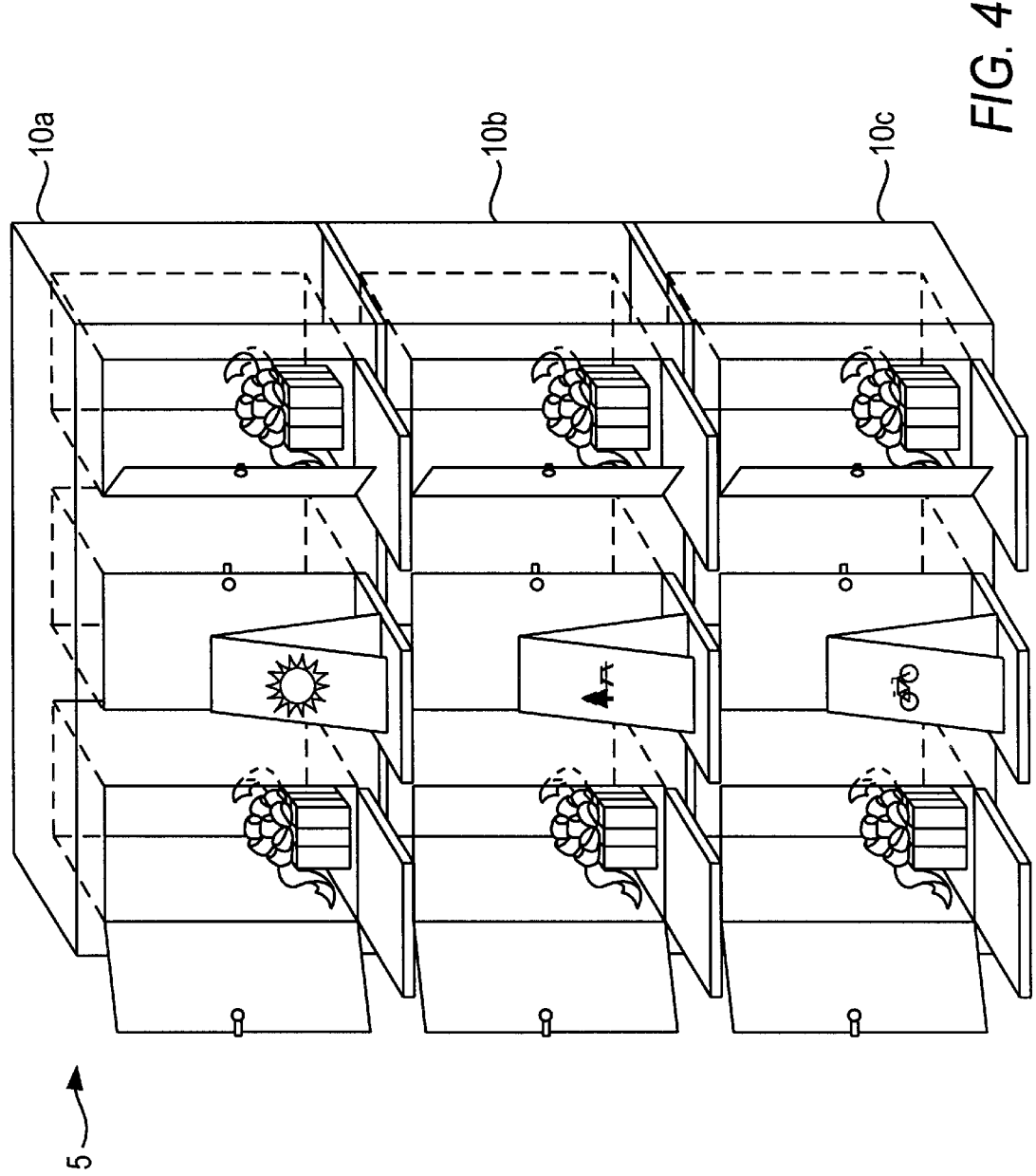
FIG. 4 is a perspective drawing showing multiple housings of the educational and/or recreational apparatus of this invention.

Referring to FIG. 4, due to a modular design having complementary exterior surfaces, multiple housings 10a, 10b, 10c, each with compartments 15, may be stacked or aligned to expand the function of any single housing 10. In the preferred embodiment, the modular design is achieved by flat surfaces allowing multiple houses to be combined to achieve a close vertical and/or horizontal proximity. This modular design allows multiple housings to have a unified appearance. A unified appearance may help to limit confusion for children having learning disabilities as additional housings are used. Optionally, each housing may have surfaces with slots or holes to receive one or more correspondingly shaped extension from other housings. The slots and extensions serve to secure or interlock multiple housings when stacking or combining them. Through a method of combining housings, the complexity of the educational and/or recreational apparatus 5 may be varied as more options for selection are added. The structure of FIG. 4 shows three housings 10a, 10b, and 10c stacked such that the front surface of each housing is joined to form a unified structure. Alternatively, the housings 10a, 10b, 10c may be placed side to side or may be placed within an instructional or recreational area such that each housing 10a, 10b, 10c is associated with the others. While the FIG. 4 shows 3 housings 10a, 10b, 10c it is understood that many more may be utilized as desired.

Figure 5:
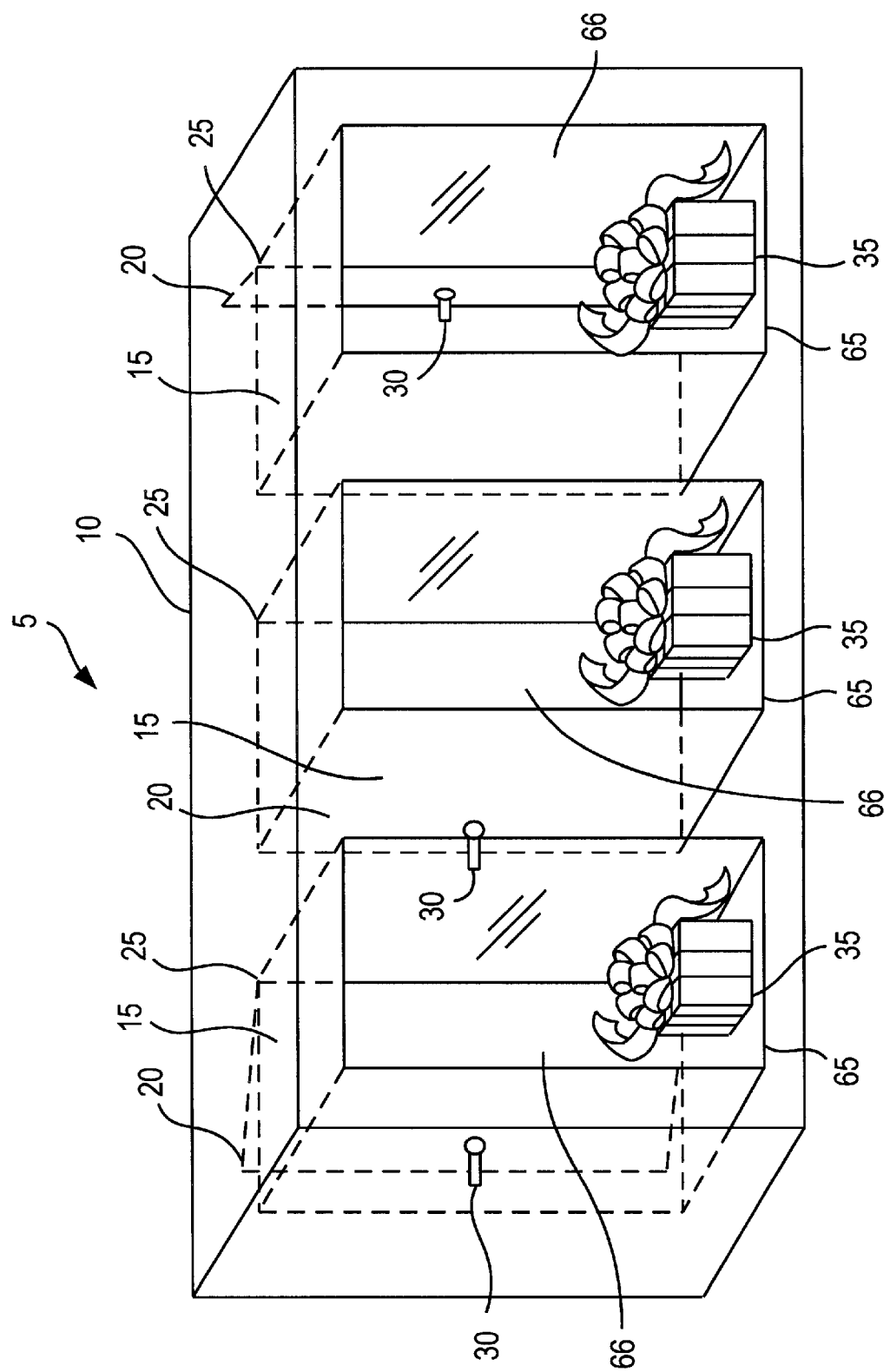
FIG. 5 is a perspective drawing of a rear view of the single housing of the educational and/or recreational apparatus of this invention.

The rear view of the educational and/or recreational apparatus of this invention is shown in FIG. 5. The rear surface 65 of the education apparatus has a rear opening 66 for each compartment 15 to facilitate placement and removal of gift objects 35 while remaining hidden from the view of children near the front surface 12 when the doors 20 are closed.

Figure 6:
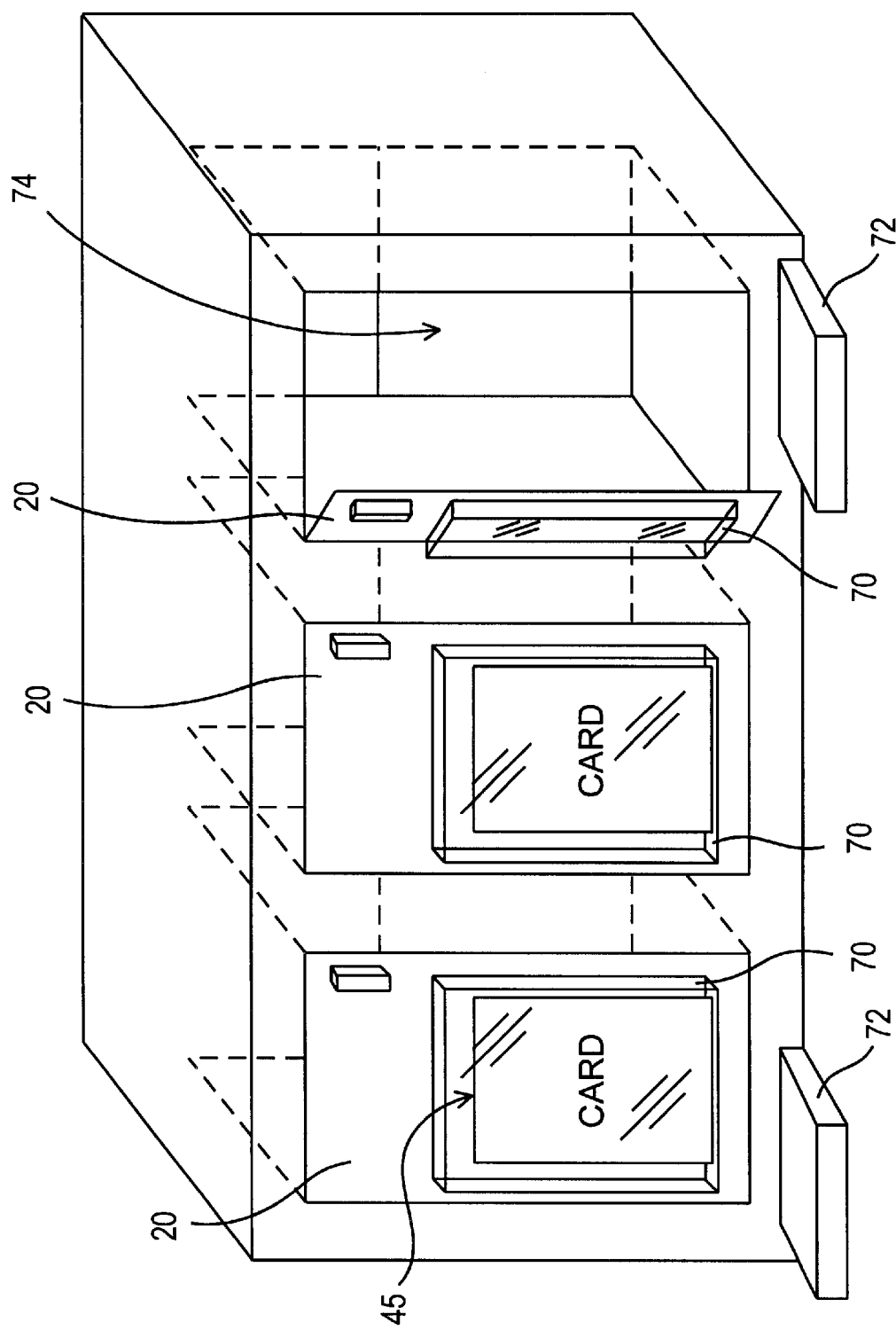
FIG. 6 is a perspective drawing of a preferred embodiment of a single housing of the educational and/or recreational apparatus of this invention.

FIG. 6 shows the preferred embodiment of the invention. The doors 20 each have a transparent window 70 that serves as the display device. A display member 45 can be inserted into the window 70 at the top of the window 70. The embodiment of FIG. 6 also shows stabilizer feet 72. With this option, the housing has feet 70 to extend from the front and or back of the housing to expand the base of support of the bottom surface of the housing. The feet, which are preferably retractable, provide stability for the bottom most housing particularly when multiple housings are stacked upon it. Thus, the housing is less likely to tip forward or back as a result of the use of feet. The housing also shows a compartment rear wall 74. The compartment rear wall 74 provides a back to the inside of each compartment 15. However, the compartment remains accessible from the rear of the housing above the rear wall 74 when the door 20 is closed.

The educational and/or recreational apparatus of this invention as described allows for dynamic variation with respect to the use of the device as either a testing, recreational or educational apparatus. In this regard, a tester or instructor has the ability to add, remove or readily change stimulus options through the use of the device's modular construction and/or by varying the information on the display members 45. In this way an instructor or tester can adapt the device for application with children of different cognitive and developmental levels. For instance, when used in a regular education classroom of preschoolers, a single housing such as shown in FIGS. 1, 2, and 3 could be used for a memory game without the display members 45 by placing a group of paired objects behind the doors with one behind each door. In this event, the children would search for the paired objects behind the doors. For higher grade levels and normal cognitive abilities, multiple housings as illustrated with respect to FIG. 4 would allow for more complex challenging of student's abilities.

When used in a more intensive, one-on-one therapy setting, with learning disabled children such as children with brain damage, mental retardation, or suffering from a memory disorder, three compartments could be used or two compartments could be used by utilizing only one housing. To this end, the simplicity of the design having only few door options is important because the distraction of the many doors may confuse the children. This simplicity addresses the problem of "stimulus over-selectivity" well known to those in the field. The progress of the child's improvement may be easily monitored as the number of doors is increased.

An important advantage of the present design involves use of the compartment 15. When a child finds a prize or token inside the compartment 15 indicating that he has made the correct choice, his learning is immediately reinforced. The importance of immediate reinforcement is a well-established principle of learning for developmentally delayed children.

Another major advantage of the educational and/or recreational apparatus of this invention is that its potential uses for teaching different subjects are as diverse as one's imagination. Due to its simplicity in operation and construction, it can be utilized for teaching a wide range of skills. For example, by appropriate selection of display members 45, the device can be used to develop skills such as, for example, letter identification, beginning and advanced reading, spelling, mathematics, memory, associations, pattern detection, visual perception, etc. There is no limitation on materials to be used as the teacher can make individualized display cards for teaching particular subjects.

The apparatus may also serve as a testing device. As it will be clear to one skilled in the art, the apparatus could be configured to test for color blindness in verbal and nonverbal children, to test memory, and to test intelligence levels where picture identification or words recognition is required (such as the Peabody Picture Vocabulary Test).

Spinners, charts, or standardized sets of materials for a particular age or developmental level may be developed for the device based upon varying the number of housings, display members and gift objects. Standardized record keeping material based on developmental, cognitive or chronological age may also be utilized.

Another important feature of the invention is that children can learn to use it effectively without the need for an instructor to be present. Because the child opens the door, learning is pro-active, an established principle in regular and special education as good practice.

Use of different exemplar objects in conjunction with the educational and/or recreational apparatus of this invention facilitates matching or association exercises. For instance, a red apple can be shown to a child and the word "red apple" is one of the choices on a display member. Additional display members may show different words such as "yellow apple", etc. The child is rewarded with a gift object in the compartment associated with the door having the "red apple" display member.

A general method for the use of the educational and/or recreational apparatus of this invention begins by providing the apparatus as above described. A gift object is placed in selected compartments. A display card having a desired response is placed on the display cards associated with the selected compartments, while incorrect responses are placed on display cards to be associated with the remaining compartments. An appropriate query is made of the participant using the educational and/or recreational apparatus of this invention. A correct response allows the participant to open a door and receive the gift object as reinforcement.

Variations of this method are outlined as follows:

1. A simple memory game and skill builder uses a configuration with two to six doors in the open position. Small toys are placed into each compartment. One or more children are asked to identify each item and remember behind which door they were placed. The doors are closed and then, one at a time, the instructor asks a child to open a door with a particular toy.
2. Another memory game may utilize multiple housings. Colored cards may be placed within the compartments, for instance nine or more, colored cards or cards with pictures on them. The object for the student is to select two doors that have matching cards.
3. Reading and letter (and number) identification skills are enhanced by placing display members w/letters or simple words on the doors and asking the child to open the door with that letter or word.
4. As an alternative to item 3 above, the instructor would describe an animal (or other object/subject) and have the child open the door with the correct name on the door. The query could be: "What is a four legged, furry animal that barks." A display member associated with a compartment having a gift object displays the word "dog."
5. Associations can be taught by using a stimulus display exemplar, or target. The instructor then asks the child to open the door that has either an identical or non-identical picture display member that relates to the exemplar. For instance, the exemplar may be a rose and one of the choices is a tulip whereas the others are animals.
6. Another example of teaching associations would be to use pictures of items as display members that correspond, or do not correspond, to either a stimulus card or a verbal instruction. For example, a picture of a key as a stimulus display card and a picture of a door lock being one of the choices.
7. Placing display members with equations on them and asking a student to open the door having a display member with the correct answer on it can enhance mathematics skills. Alternatively, the display members might have numbers. The instructor then presents a mathematical equation and the child is prompted to open the door with the display member having the correct solution.
8. Naming objects can be done by using pictures on display members and asking a child to open the door that corresponds to the object.
9. Teaching equivocation in language is accomplished, for example, by using higher and lower numbered display members and asking the child to open the door having a display member with the higher number. This may be followed by having three of the same numbered cards but one on the bottom of the card, one in the middle and one on top and asking the same questions. The same may be achieved using display members with the words mail (correspondence), male and mail suit of armor, or son and sun.
10. Pattern recognition may be taught by using more abstract display members in various rows and having the student pick the door that would go in the missing spot. For example, the first column of the top row is a red triangle over blue. The middle row is green triangle over blue. The bottom row is a yellow triangle over blue. The middle column, top row is a black triangle over blue. The middle row is a brown triangle over blue. The bottom row of the second column would be empty and there would be three cards presented in the last three doors one, of which, would have a blue triangle on the bottom making it the only correct choice.

11. Testing for color blindness could be achieved by using display members with the color test patterns used for testing color blindness and presenting them in the display device associated with the doors and asking the child to open the appropriate one.

12. Testing for verbal IQ can be accomplished in a manner similar to the Peabody Picture Vocabulary Test wherein a child is shown four pictures and asked to point to the correct one. The difference being, he would open the door and get a token for each correct answer making testing fun for both the child and tester.

13. Testing for visual perception may be achieved by asking a student to match a target picture to a picture on one of a group of display members associated with the doors of the current invention.

While this invention has been particularly shown and described with reference to the preferred embodiments thereof, it will be understood by those skilled in the art that various changes in form and details may be made without departing from the spirit and scope of the invention.

What is claimed is:

1. An educational apparatus comprising:
   at least one housing containing a plurality of compartments, each compartment with an interior, whereby each of said plurality of compartments has a first opening on a first surface of said housing, and whereby the exterior of said housing is vertically modular to allow a vertical complementary connection with other said housings to form a uniform surface from said first surface when said housings are vertically connected;
   a plurality of removable covers, whereby each removable cover is placed at a first opening to selectively expose and conceal the interior of a compartment;
   a plurality of display devices at a first opening of one of said plurality of compartments for selectively varying information associated with said first opening; and
   at least one second opening wherein said second opening provides access to said interior of said compartments without opening any of said removable covers wherein said second opening is on a surface of said compartments opposite said first opening whereby said first opening continues through to said second opening.

2. The apparatus of claim 1 comprising at least one hinge wherein said hinge attaches one of said removable covers to said first surface of the housing in close proximity to a corresponding first opening.

3. The apparatus of claim 1 further comprising at least one latch, whereby each latch is connected to one of said removable covers to selectively secure said covers to said first surface.

4. The apparatus of claim 1 wherein said display devices are attached to said first surface.

5. The apparatus of claim 1 wherein said display devices are attached to said removable covers.

6. The apparatus of claim 1 wherein at least one of said display devices is a shelf.

7. The apparatus of claim 1 wherein at least one of said display devices is a transparent pocket on an outer surface of said removable covers.

8. The apparatus of claim 1 wherein said exterior of said housing is formed by flat surfaces.

9. The apparatus of claim 1 wherein said exterior of said housing is formed by interlocking surfaces.

10. The apparatus of claim 1 further comprising at least one display member.

11. The apparatus of claim 10 wherein said display member contains graphic or textual information.

12. An educational and/or recreational apparatus comprising:
   an exterior housing with surfaces appropriate for vertical complementary connection with other said exterior housings when said housings are vertically connected, wherein said exterior housing has a plurality of internal compartments;
   a plurality of covers, whereby each cover is associated with a first opening to selectively expose and conceal an interior of one of said compartments; and
   a plurality of display devices, whereby each display device is at one of said compartments for selectively varying information presented at said compartments;
   at least one second opening wherein said second opening provides access to said interior of at least one of said compartments without opening any of said covers wherein said second opening is on a surface of said compartment opposite said first opening whereby said first opening continues through to said second opening.

13. The apparatus of claim 12 wherein each cover has a hinge attached to a first surface of the housing in close proximity to a corresponding first opening.

14. The apparatus of claim 12 wherein each cover has a latch to selectively secure said cover to a first surface.

15. The apparatus of claim 12 wherein said display devices are attached to said first surface.

16. The apparatus of claim 12 wherein said display devices are attached to said removable covers.

17. The apparatus of claim 12 wherein at least one of said display devices is a shelf.

18. The apparatus of claim 12 wherein at least one of said display devices is a transparent pocket on an outer surface of said removable covers.

19. The apparatus of claim 12 wherein said surfaces of said exterior housing are flat.

20. The apparatus of claim 12 wherein said surfaces of said exterior housing are interlocking.

21. The apparatus of claim 12 further comprising at least one display member.

22. The apparatus of claim 12 wherein said display member contains graphic or textual information.

23. An educational and/or recreational apparatus comprising:
   a plurality of exterior housings having two or more flat exterior surfaces appropriate for modularly vertical complimentary joining when said housings are vertically connected wherein said housings have three internal compartments;
   three hinged covers, whereby each cover is associated with a first opening to selectively expose and conceal an interior of one said compartment;
   at least one second opening opposite said first opening wherein said second opening may be used for access to said interior of at least one of said compartments without opening said compartment's associated cover;
   at least three display members containing graphic or textual information; and
   three display devices, whereby each display device is associated with one of said compartments to receive at least one said display member.

* * * * *